United States Patent
Haridwarkar et al.

(10) Patent No.: US 10,711,882 B2
(45) Date of Patent: Jul. 14, 2020

(54) OPERATING SHIFT APPARATUS FOR MANUAL TRANSMISSION

(71) Applicants: HYUNDAI MOTOR COMPANY, Seoul (KR); KIA MOTORS CORPORATION, Seoul (KR)

(72) Inventors: Hari Gothra Haridwarkar, Hyderabad (IN); Aluri Vamsee Krishna, Andhra Pradesh (IN)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 186 days.

(21) Appl. No.: 16/126,727

(22) Filed: Sep. 10, 2018

(65) Prior Publication Data
US 2019/0383385 A1   Dec. 19, 2019

(30) Foreign Application Priority Data

Jun. 15, 2018 (IN) .............................. 201811022547

(51) Int. Cl.
   *F16H 59/02*   (2006.01)
   *B60K 20/04*   (2006.01)
   *F16H 59/10*   (2006.01)

(52) U.S. Cl.
   CPC .......... *F16H 59/0278* (2013.01); *B60K 20/04* (2013.01); *F16H 59/10* (2013.01); *F16H 2059/0265* (2013.01)

(58) Field of Classification Search
   CPC ................. F16H 59/0278; F16H 59/10; F16H 2059/0265; F16H 61/36; F16H 61/34; B60K 20/04
   See application file for complete search history.

(56) References Cited

U.S. PATENT DOCUMENTS

| 1,736,320 A | * | 11/1929 | Melchor | ............... F16H 59/042 74/502.5 |
| 3,899,934 A | * | 8/1975 | Froumajou | ............ B60K 20/04 74/471 XY |

(Continued)

FOREIGN PATENT DOCUMENTS

| JP | 4629591 B2 | 2/2011 |
| KR | 10-1620265 B1 | 5/2016 |
| KR | 10-1673781 B1 | 11/2016 |

*Primary Examiner* — Zakaria Elahmadi
(74) *Attorney, Agent, or Firm* — Morgan, Lewis & Bockius LLP (57) ABSTRACT

An operating shift apparatus for a manual transmission includes: an operating lever having an upper end at which a handle is disposed and a lower end extending toward a lever box; a shift lever having a shift joint disposed at a lower end of the shift lever; a connecting lever, an upper end of which is rotatably connected with the shift lever, having a cylinder joint which is downwardly protruded; a select lever having a select groove into which the cylinder joint is accommodated, a select joint disposed at a front end of the select lever, a return protrusion which is downwardly protruded, and a guide groove which is formed at both ends thereof, wherein the lever box has a guide rail which is engaged with the guide groove; and a return spring contacting the return protrusion to return the select lever to an original position.

14 Claims, 8 Drawing Sheets

(56) References Cited

U.S. PATENT DOCUMENTS

| | | | | |
|---|---|---|---|---|
| 4,630,499 | A * | 12/1986 | Hopkins | F16H 59/10 74/473.33 |
| 4,693,135 | A * | 9/1987 | LaRocca | F16H 59/04 74/473.21 |
| 4,799,398 | A * | 1/1989 | Asano | E01C 19/262 180/19.1 |
| 5,755,313 | A * | 5/1998 | Kim | F16H 59/10 192/219.6 |
| 6,098,483 | A * | 8/2000 | Syamoto | F16H 59/10 74/473.12 |
| 6,810,761 | B2 * | 11/2004 | Teijeiro Castro | F16H 61/36 74/473.1 |
| 8,371,188 | B2 * | 2/2013 | Bortolon | F16H 59/0204 74/473.21 |
| 8,863,603 | B2 * | 10/2014 | Patzold | F16H 59/0204 74/473.25 |
| 2009/0217781 | A1 * | 9/2009 | Kusayama | F16H 59/04 74/473.15 |
| 2010/0107800 | A1 * | 5/2010 | Sickart | F16H 61/22 74/473.23 |
| 2010/0242658 | A1 * | 9/2010 | Patzold | F16H 59/10 74/473.24 |
| 2016/0273648 | A1 * | 9/2016 | Kato | F16H 59/105 |
| 2016/0290495 | A1 * | 10/2016 | Bak | G01D 5/142 |
| 2017/0204965 | A1 * | 7/2017 | Niwa | F16H 59/10 |

\* cited by examiner

OPERATING SHIFT APPARATUS FOR MANUAL TRANSMISSION

RELATED APPLICATION

This application claims the benefit of Indian Patent Application No. 201811022547 filed on Jun. 15, 2018, the disclosure of which application is incorporated by reference herein.

TECHNICAL FIELD

The present disclosure relates to an operating shift apparatus for a manual transmission, and more particularly, to an operating shift apparatus for a manual transmission capable of improving accuracy of a shifting operation even though a composition thereof is simplified.

BACKGROUND

Generally, a transmission for shifting a rotation speed of an engine is provided between a clutch and a drive shaft of a vehicle. Particularly, when the transmission is a manual transmission, an operating shift apparatus is provided so that a driver can operate the transmission according to a running state of the vehicle.

The operating shift apparatus is configured to include a control finger, a plurality of shift lugs, a select lever moving the control finger so as to select a shift lug among the plurality of shift lugs for actuating a demanded shift stage, a shift lever operating the control finger so as to operate the selected shift lug, and so on. In addition, a select cable connecting the select lever with the control finger such that a select control is performed depending on operation of an operating lever the driver, and a shift cable connecting the shift lever with the control finger such that a shift control is performed depending on operation of the operating lever by the driver may be provided.

Therefore, in the manual transmission, the driver alternately performs the select control and shift control by using the operating lever, thereby achieving shift operation.

However, in an ordinary manual transmission, a spherical joint, which is disposed at a lower end of the shift lever for achieving both the select control and the shift control, and complex components converting a rotary motion of the spherical joint to each linear motion for the select control and shift control, may be required.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide an operating shift apparatus for a manual transmission having advantages of achieving shift operation by a simple composition in which a spherical joint can be removed.

An operating shift apparatus for a manual transmission according to an exemplary embodiment of the present disclosure may include: an operating lever having an upper end at which a handle is disposed and a lower end extending toward a lever box; a shift lever, an upper end of which is integrally combined with the lower end of the operating lever, having a shift joint disposed at a lower end of the shift lever, wherein a shift cable is connected to the shift joint; a connecting lever, an upper end of which is rotatably connected with the shift lever, having a cylinder joint of a cylindrical shape which is downwardly protruded and disposed at a lower end of the connecting lever; a select lever having a select groove, into which the cylinder joint is accommodated, disposed at an upper end thereof, a select joint which is disposed at a front end of the select lever, the select joint to which a cable is connected, a return protrusion which is downwardly protruded and disposed at a lower end of the select lever, and a guide groove which is disposed at both ends of the select lever, in which the lever box may have a guide rail which is engaged with the guide groove of the select lever and fixed to a vehicle body; and a return spring provided to the lever box and contacting the return protrusion so as to return the select lever to an original position of the return protrusion.

The select lever may be configured to move in a forward and rear direction as the cylinder joint is slid along the select groove, and a motion of the select lever may be guided as the guide groove is slid along the guide rail.

An overall shape of the connecting lever may be a "U" shape so that portions being branched are upper ends of the connecting lever, a hinge hole may be bored to the respectively branched upper ends of the connecting lever, and a hinge shaft, which is formed in a cylindrical shape and disposed between the upper end and the lower end of the shift lever, may be inserted into the hinge hole so as to be hinge-connected with the connecting lever.

The hinge shaft may extend in a width direction of the vehicle body.

The shift joint may be disposed in a spatial portion inside the "U" shape of the connecting lever.

The lever box may have a stabilizing groove at inner sides thereof which both ends of the hinge shaft contact.

The stabilizing groove may have a width corresponding to a diameter of the hinge shaft having a cylindrical shape in the forward and rear direction, and have an arc shape in an up and down direction of the vehicle body.

The shift lever may include a pin hole, which is bored in a cylindrical shape, being orthogonal with the hinge shaft and having an axis extending in the forward and rear direction as a center axis, such that the shift lever and the connecting lever may make a lever motion around the pin hole when the operating lever is operated in a width direction of the vehicle body.

The arc shape of the stabilizing groove may have a same radius as a rotation radius of the hinge shaft rotating around the pin hole.

The select groove, having a width corresponding to a diameter of the cylinder joint, may lengthily extend to be slanted with respect to the forward and rear direction and a width direction of the vehicle body.

Select control may be performed as the cylinder joint moves in the width direction along the select groove such that the select lever moves in the forward and rear direction when the operating lever is operated in the width direction.

The return spring may surround a front and a rear of the return protrusion so as to push the return protrusion back to the original position of the return protrusion when the return protrusion moves forward or backward.

The select lever may be returned to an original position of the select lever when a force is not acting on the operating lever in a releasing state of a shift control.

Shift control may be performed as the shift lever makes a lever motion around the hinge shaft such that the shift joint moves in the forward and rear direction when the operating lever is operated in the forward and rear direction.

The shift joint and the select joint may be arranged on one plane with respect to a width direction of the vehicle body.

DETAILED DESCRIPTION

An exemplary embodiment of the present disclosure will hereinafter be described in detail with reference to the accompanying drawings.

Figure 1:
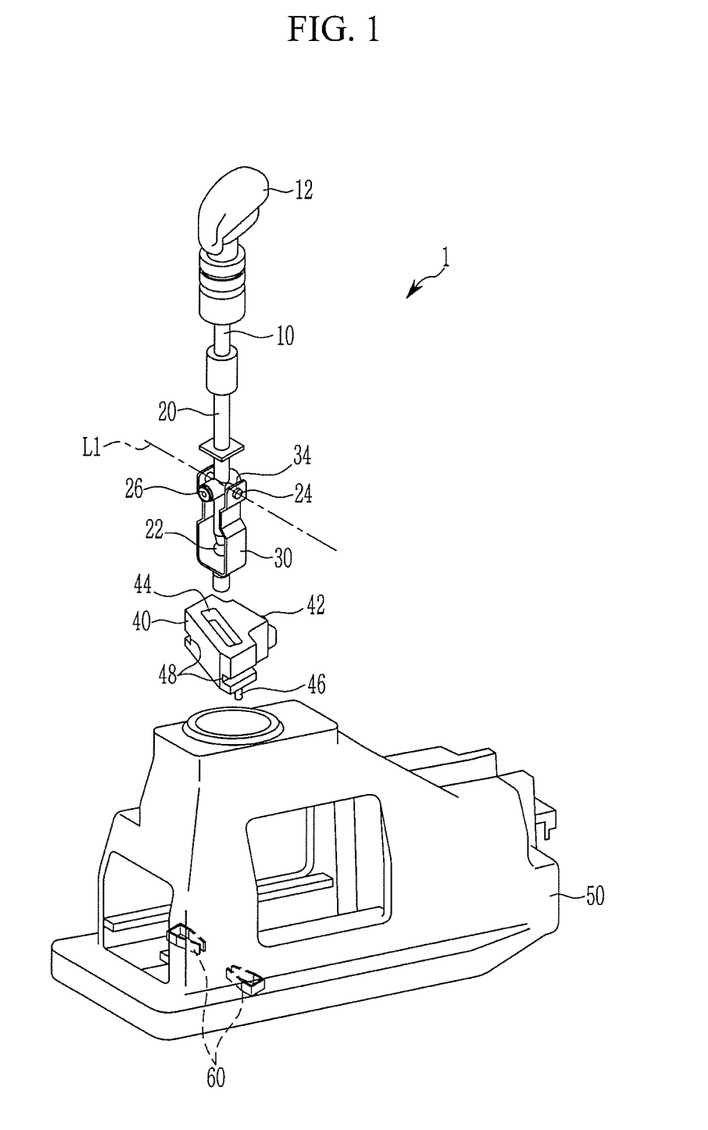
FIG. 1 is an exploded perspective view of an operating shift apparatus for a manual transmission according to an exemplary embodiment of the present disclosure.
Figure 2:
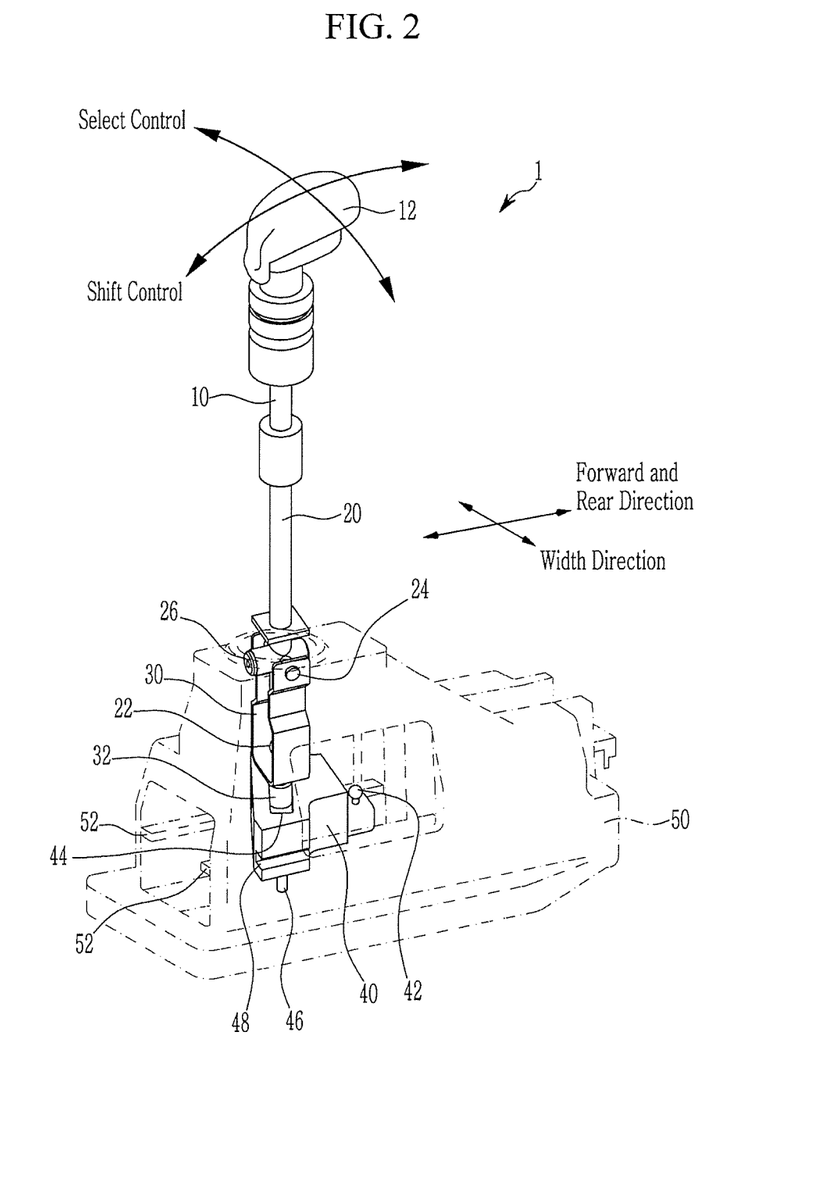
FIG. 2 is a perspective view of an operating shift apparatus for a manual transmission according to an exemplary embodiment of the present disclosure.

FIG. 1 is an exploded perspective view of an operating shift apparatus for a manual transmission according to an exemplary embodiment of the present disclosure, and FIG. 2 is a perspective view of an operating shift apparatus for a manual transmission according to an exemplary embodiment of the present disclosure.

As shown in FIG. 1 and FIG. 2, an operating shift apparatus 1 for a manual transmission according to an exemplary embodiment of the present disclosure includes an operating lever 10, a shift lever 20, a connecting lever 30, a select lever 40, a lever box 50, and a return spring 60.

The operating lever 10 is directly operated by a driver. In FIG. 2, operating directions of the operating lever 10 by the driver for performing select control and shift control are illustrated by arrows. In addition, a handle 12 with improved grip sensation is disposed at an upper end of the operating lever 10 such that the driver can easily operate the operating lever 10. Further, a lower end of the operating lever 10 extends toward the lever box 50 which is fixed to a vehicle body. In the present disclosure, an up and down direction is determined with respect to the upper end and the lower end of the operating lever 10 and is same as a general up and down direction of the vehicle body, but it is not limited thereto.

The shift lever 20 is configured so that an upper end thereof is integrally combined with the lower end of the operating lever 10 so as to move together with the operating lever 10. In addition, a shift joint 22, to which a shift cable (not shown) is connected, is disposed at the lower end of the shift lever 20, and the lower end of the shift lever 20 is inserted into an interior of the lever box 50. Here, the shift joint 22 pushes or pulls the shift cable by a motion thereof.

The connecting lever 30 is disposed in the lever box 50 at a lower side of the shift lever 20. In addition, an overall shape of the connecting lever 30 is formed in a "U" shape and end portions being branched are upper ends of the connecting lever 30. Further, a cylinder joint 32 having a cylindrical shape is downwardly protruded and disposed at a lower end of the connecting lever 30. A hinge hole 34 is bored to the respectively branched upper ends of the connecting lever 30. Meanwhile, a hinge shaft 24 having a cylindrical shape is disposed between the upper end and the lower end of the shift lever 20. The hinge shaft 24 extends in a width direction of the vehicle body, and a centrifugal extended line L1 of the hinge shaft 24 is illustrated as a single-dot chain line in FIG. 1. In addition, both ends of the hinge shaft 24 are respectively inserted into the hinge hole 34 so as to hinge-connect the connecting lever 30 to the shift lever 20 and realize relative rotation between the connecting lever 30 and the shift lever 20. Here, the lower end of the shift lever 20 at which the shift joint 22 is formed is disposed in a spatial portion inside the "U" shape of the connecting lever 30.

The select lever 40 is disposed in the lever box 50 at a lower side of the connecting lever 30. In addition, a select joint 42 to which a select cable (not shown) is connected is disposed at a front end of the select lever 40. Here, the select joint 42 pushes or pulls the select cable by a motion thereof. In the present disclosure, a forward and rear direction determined with respect to the front end of the select lever 40 and is the same as a general forward and rear direction of the vehicle body, but it is not limited thereto. A select groove 44 in which the cylinder joint 32 is accommodated is disposed at an upper end of the select lever 40, a return protrusion 46 is downwardly protruded and disposed at a lower end of the select lever 40, and a guide groove 48 guides a motion of the select lever 40 and disposed at respective side ends of the select lever 40. Further, the select lever 40 moves in the forward and rear direction as the cylinder joint 32 is slid along a shape of the select groove 44 inside the select groove 44.

The lever box 50 is fixed to the vehicle body, and the shift cable and the select cable are connected to the shift joint 22 and the select joint 42, respectively, inside the lever box 50. In addition, a guide rail 52 is formed at the lever box 50 so as to be engaged with the guide groove 48. Therefore, when the select lever 40 moves in the forward and rear direction, a motion of the select lever 40 is guided as the guide groove 48 is slid along the guide rail 52. Here, a basic composition of a manual transmission for performing select control and shift control, as components such as a control finger (not shown) and a shift lug (not shown) are mutually moved by the operation of the shift cable and the select cable, is well known to a person of ordinary skill in the art, so a detailed description thereof will be omitted.

The return spring 60 is disposed in the lever box 50. In addition, the function of the return spring 60 is to return the select lever 40 to an original position N while contacting the return protrusion 46 which is formed at the lower end of the select lever 40. Here, the original position N of the select lever 40 is a position for achieving a neutral stage.

Hereinafter, select control according to an exemplary embodiment of the present disclosure will be described referring to FIG. 3 to FIG. 5.

Figure 3:
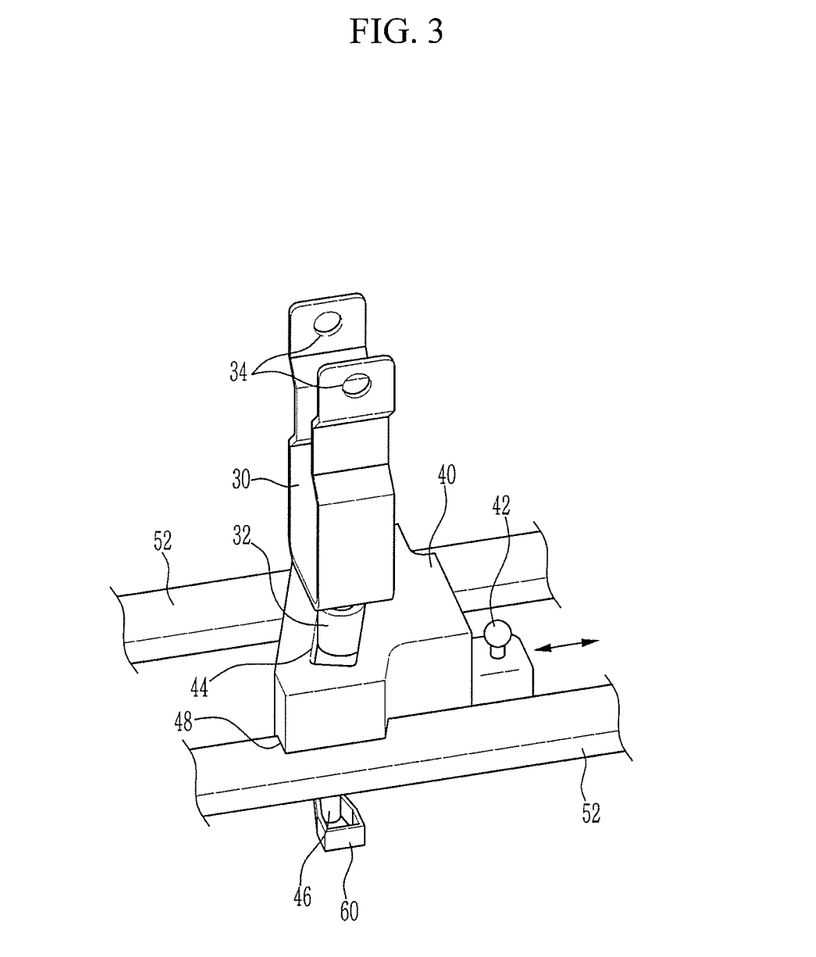
FIG. 3 is a partial perspective view illustrating a select lever of an operating shift apparatus for a manual transmission according to an exemplary embodiment of the present disclosure.
Figure 4:
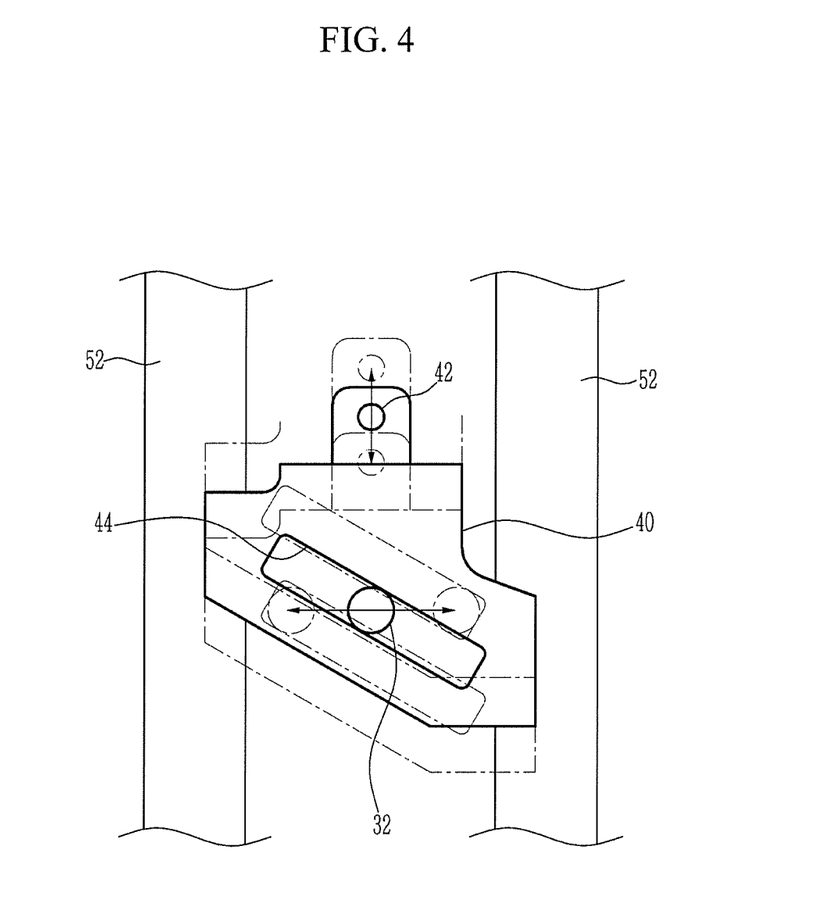
FIG. 4 is a top view of FIG. 3.
Figure 5:
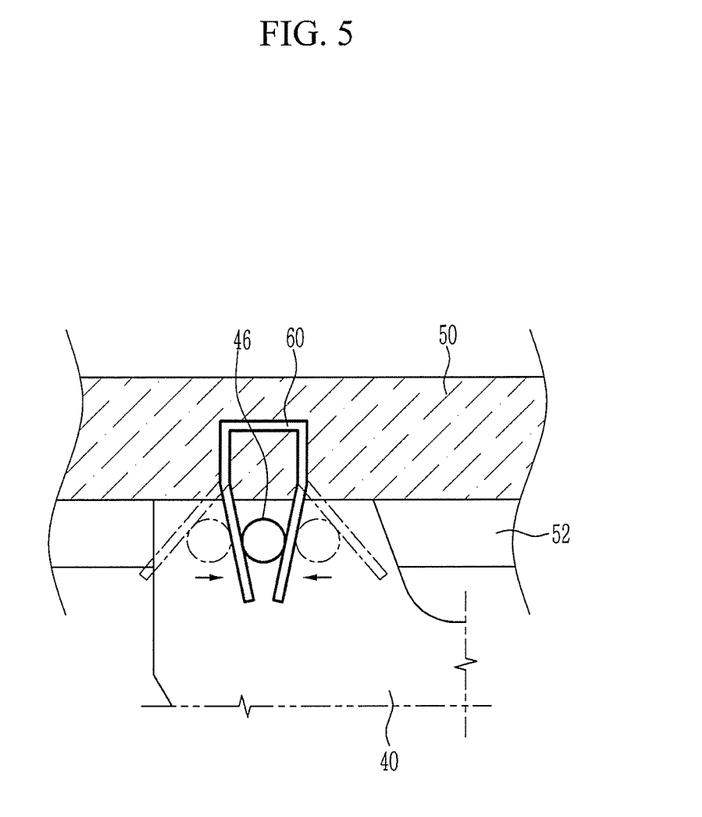
FIG. 5 is a bottom view of FIG. 3.

FIG. 3 is a partial perspective view illustrating a select lever of an operating shift apparatus for a manual transmission according to an exemplary embodiment of the present disclosure, FIG. 4 is a top view of FIG. 3, and FIG. 5 is a bottom view of FIG. 3.

As shown in FIG. 3 and FIG. 4, the select groove 44 is formed in a rectangular shape which has a shorter side having lengths corresponding to a diameter of the cylinder joint 32 having the cylindrical shape and a longer side being extended to be longer than the diameter of the cylinder joint 32. In addition, if the direction of being lengthily extended is represented by a length direction of the select groove 44, the select groove 44 is formed so that the length direction is slanted with respect to the forward and rear direction and the width direction. Therefore, when the operating lever 10 is operated in the width direction by the driver such that select control is performed (referring to FIG. 2), select control is performed as the cylinder joint 32 moves in the width direction along the select groove 44 and the select lever 40 moves in the forward and rear direction. In FIG. 4, displacement of the cylinder joint 32 in the width direction and displacement of the select groove 44 and the select joint 42 in the forward and rear direction in a state that the select lever 40 has moved depending on movement of the cylinder joint 32 in the width direction are illustrated as a single-dot chain line.

As shown in FIG. 3 and FIG. 5, the return spring 60 is disposed to surround a front and a rear of the return protrusion 46. In addition, the function of the return spring 60 is to push the return protrusion 46 backward when the return protrusion 46 moves forward and to push the return protrusion 46 forward when the return protrusion 46 moves backward. Thus, the select lever 40 returns to the original position N when the driver does not apply a force to the operating lever 10 in a state of releasing shift control. In FIG. 5, displacement of the return protrusion 46 in the forward and rear direction and displacement of the return spring 60, which is transformed depending on movement of the return protrusion 46, in the forward and rear direction are illustrated as a single-dot chain line.

Hereinafter, shift control according to an exemplary embodiment of the present disclosure will be described referring to FIG. 6.

Figure 6:
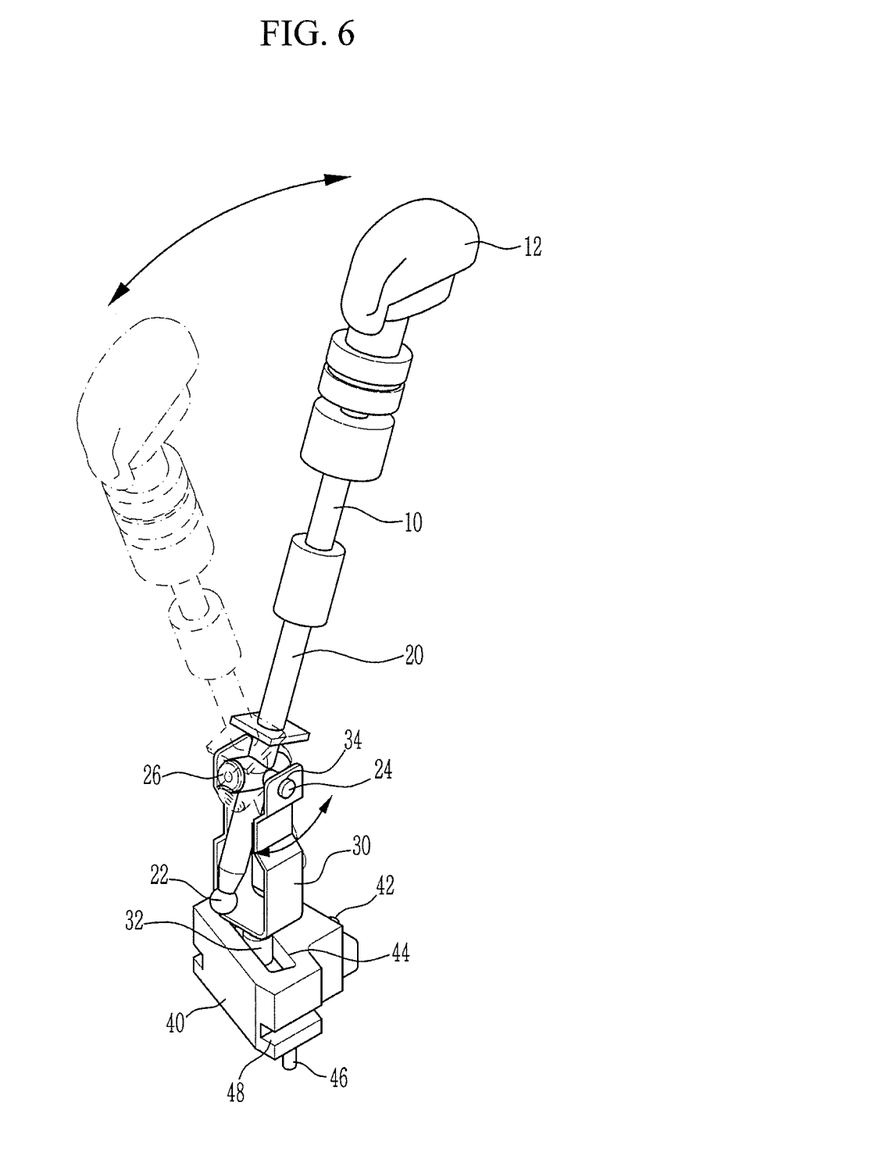
FIG. 6 is a partial perspective view illustrating a shift lever of an operating shift apparatus for a manual transmission according to an exemplary embodiment of the present disclosure.

FIG. 6 is a partial perspective view illustrating a shift lever of an operating shift apparatus for a manual transmission according to an exemplary embodiment of the present disclosure.

As shown in FIG. 6, if the operating lever 10 is operated in the forward and rear direction by the driver such that shift control is performed (referring to FIG. 2), shift control is performed as the shift lever 20 makes a lever motion around the hinge shaft 24 such that the shift joint 22 moves in the forward and rear direction.

Figure 7:
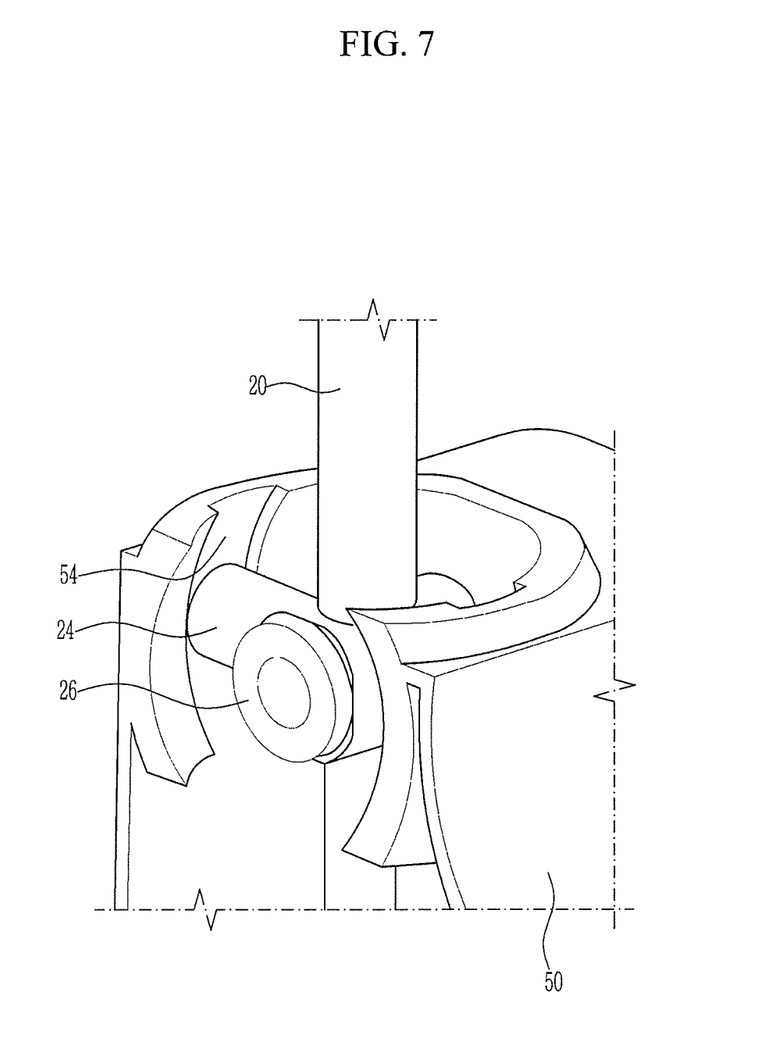
FIG. 7 is a partial enlarged view of a lever box according to an exemplary embodiment of the present disclosure.

FIG. 7 is a partial enlarged view of a lever box according to an exemplary embodiment of the present disclosure.

As shown in FIG. 7, both ends of the hinge shaft 24 contact the lever box 50. In addition, the lever box 50 forms a stabilizing groove 54 at inner-sides which both ends of the hinge shaft 24 contact. The stabilizing groove 54 has a width corresponding to a diameter of the hinge shaft 24 having a cylindrical shape in the forward and rear direction and has an arc shape in the up and down direction. Therefore, when the shift lever 20 makes a lever motion for shift control, stability can be ensured as the hinge shaft 24 is supported to the stabilizing groove 54 of the lever box 50. Further, a pin hole 26, which is bored in a cylindrical shape being orthogonal with the hinge shaft 24 and having an axis extending in the forward and rear direction as a center axis, is formed at the shift lever 20. A pin (not shown) fixed to the lever box 50 may be inserted into the pin hole 26. Here, when the operating lever 10 is operated in the width direction by a driver such that select control is performed, the shift lever 20 and the connecting lever 30 make a lever motion around the pin hole 26 such that the cylinder joint 32 moves in the width direction along the select groove 44. In this regard, the arc shape of the stabilizing groove 54 has a same radius as a rotation radius of the hinge shaft 24 rotating around the pin hole 26. Therefore, when the connecting lever 30 makes a lever motion such that the select lever 40 moves for select control, stability can be ensured as the hinge shaft 24 rotates along the arc shape of the stabilizing groove 54.

Figure 8:
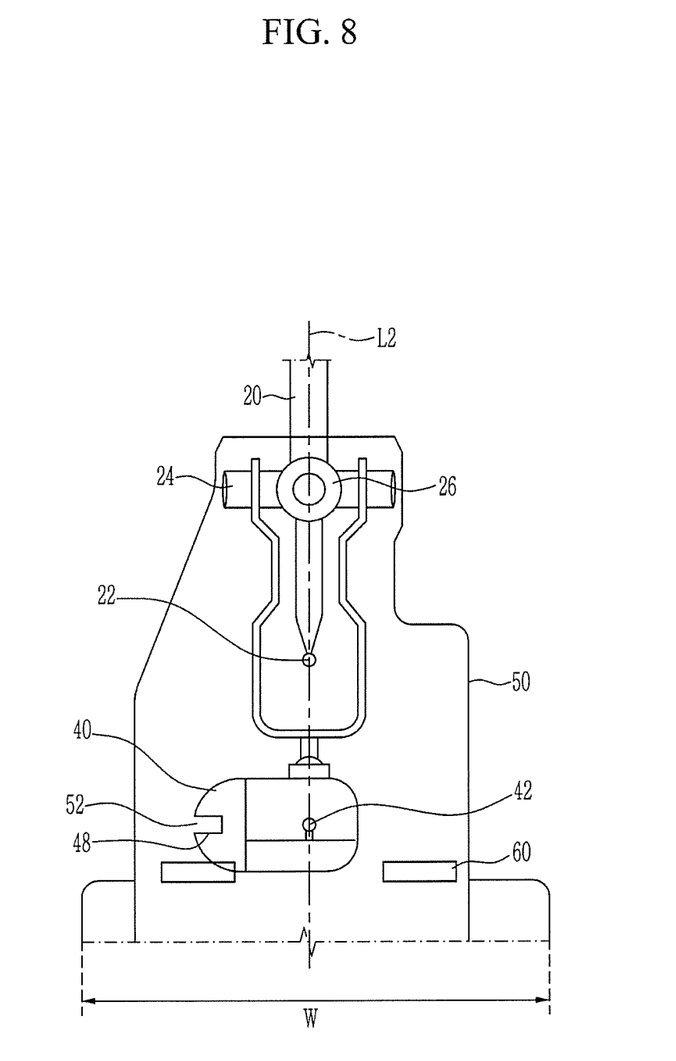
FIG. 8 is a front view of an operating shift apparatus for a manual transmission according to an exemplary embodiment of the present disclosure.

FIG. 8 is a front view of an operating shift apparatus for a manual transmission according to an exemplary embodiment of the present disclosure.

As shown in FIG. 8, since the shift joint 22 and the select joint 42 are arranged on one plane with respect to the width direction, a width W of an operating shift apparatus 1 for a manual transmission according to an exemplary embodiment of the present disclosure may be relatively small in comparison with existing operating shift apparatus. In FIG. 8, a line L2 formed by the one plane in a front view is illustrated as a single-dot chain line.

According to an exemplary embodiment of the present disclosure, accuracy of shifting operation can be improved as select control and shift control are realized by the cylinder joint 32 having a cylindrical shape. In addition, an entire composition may be simple as an ordinarily used spherical-shape joint is replaced with the cylinder joint 32 having a cylindrical shape such that complex components for converting a rotary motion of the spherical joint to each linear motion for select control and shift control is not required.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An operating shift apparatus for a manual transmission, comprising:
    an operating lever having an upper end at which a handle is disposed and a lower end extending toward a lever box;
    a shift lever, an upper end of which is integrally combined with the lower end of the operating lever, having a shift joint disposed at a lower end of the shift lever, wherein a shift cable is connected to the shift joint;
    a connecting lever, an upper end of which is rotatably connected with the shift lever, having a cylinder joint of a cylindrical shape which is downwardly protruded and disposed at a lower end of the connecting lever;
    a select lever having a select groove, into which the cylinder joint is accommodated, disposed at an upper end thereof, a select joint which is disposed at a front end of the select lever, the select joint to which a select cable is connected, a return protrusion which is downwardly protruded and disposed at a lower end of the select lever, and a guide groove which is respectively disposed at both ends of the select lever, wherein the lever box has a guide rail which is engaged with the guide groove of the select lever and fixed to a vehicle body; and
    a return spring provided to the lever box and contacting the return protrusion so as to return the select lever to an original position of the return protrusion,
    wherein the select lever is configured to move in a forward and rear direction of the vehicle body as the cylinder joint is slid along the select groove and a motion of the select lever is guided as the guide groove is slid along the guide rail.

2. The operating shift apparatus of claim 1, wherein an overall shape of the connecting lever is an "U" shape so that portions being branched are upper ends of the connecting lever, a hinge hole is bored to the respectively branched upper ends of the connecting lever, and a hinge shaft, which is formed in a cylindrical shape and disposed between the upper end and the lower end of the shift lever, is inserted into the hinge hole so as to be hinge-connected with the connecting lever.

3. The operating shift apparatus of claim 2, wherein the hinge shaft extends in a width direction of the vehicle body.

4. The operating shift apparatus of claim 2, wherein the shift joint is disposed in a spatial portion inside the "U" shape of the connecting lever.

5. The operating shift apparatus of claim 2, wherein the lever box has a stabilizing groove at inner sides thereof which both ends of the hinge shaft contact.

6. The operating shift apparatus of claim 5, wherein the stabilizing groove has a width corresponding to a diameter of the hinge shaft having a cylindrical shape in the forward and rear direction, and has an arc shape in an up and down direction of the vehicle body.

7. The operating shift apparatus of claim 6, wherein the shift lever includes a pin hole, which is bored in a cylindrical shape, being orthogonal with the hinge shaft and having an axis extending in the forward and rear direction as a center axis, such that the shift lever and the connecting lever make a lever motion around the pin hole when the operating lever is operated in a width direction of the vehicle body.

8. The operating shift apparatus of claim 7, wherein the arc shape of the stabilizing groove has a same radius as a rotation radius of the hinge shaft rotating around the pin hole.

9. The operating shift apparatus of claim 1, wherein the select groove, having a width corresponding to a diameter of the cylinder joint, lengthily extends to be slanted with respect to the forward and rear direction and a width direction of the vehicle body.

10. The operating shift apparatus of claim 9, wherein the cylinder joint is configured to move in the width direction along the select groove such that the select lever moves in the forward and rear direction when the operating lever is operated in the width direction, in order to perform a select control.

11. The operating shift apparatus of claim 1, wherein the return spring surrounds a front and a rear of the return protrusion so as to push the return protrusion back to the original position of the return protrusion when the return protrusion moves forward or backward.

12. The operating shift apparatus of claim 11, wherein the select lever is returned to an original position of the select lever when a force is not acting on the operating lever in a releasing state of a shift control.

13. The operating shift apparatus of claim 1, wherein the shift lever makes a lever motion around the hinge shaft such that the shift joint moves in the forward and rear direction when the operating lever is operated in the forward and rear direction, in order to perform a shift control.

14. The operating shift apparatus of claim 1, wherein the shift joint and the select joint are arranged on one plane with respect to a width direction of the vehicle body.

* * * * *